April 14, 1925.                                              1,533,222
                    D. F. CASHMAN
                  CONTROL MECHANISM
                  Filed Aug. 7, 1923
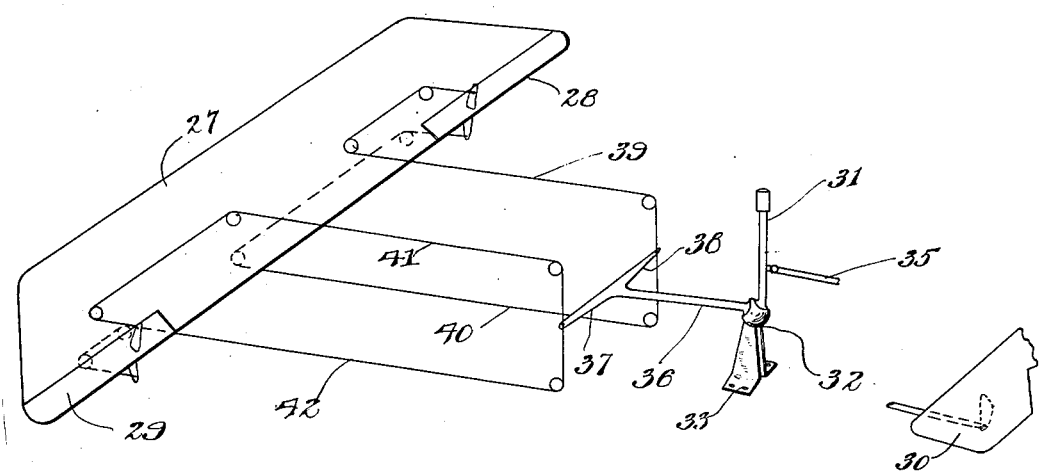
INVENTOR
*Dennis F. Cashman*
BY
*Robert H. Young* ATTORNEY Patented Apr. 14, 1925.

1,533,222

UNITED STATES PATENT OFFICE.

DENNIS F. CASHMAN, OF DAYTON, OHIO.

CONTROL MECHANISM.

Application filed August 7, 1923. Serial No. 656,204.

*To all whom it may concern:*

Be it known that I, DENNIS F. CASHMAN, a citizen of the United States, residing at Dayton, in the county of Montgomery and State of Ohio, have invented certain new and useful Improvements in Control Mechanism, of which the following is a specification.

This invention relates to controlling devices for aircraft and is particularly adapted for the control of a small airplane or of a glider.

The object of this invention is to provide a control of this kind which will be easily operated by the hand of the pilot in order to control both the ailerons or horizontal rudder.

A further object is to provide a control as just described, which will enable the horizontal rudder to be operated at the same time as the ailerons are moved, so that the ailerons and rudder assist each other in changing the position of the aircraft above a transverse horizontal axis. The control will also be capable of operating the ailerons or wing flaps in opposite directions for stability and at the same time controlling the horizontal rudder to assist this stabilizing action of the wing flaps.

Further objects will be more fully set forth in the attached specification and claim and in the drawings, in which:

Fig. 1 is a diagrammatical view of my improved controlling device.

Referring to Fig. 1, I have shown a plane 27 provided with a right aileron 28 and a left aileron 29. A horizontal rudder 30 at the rear of the machine is provided to guide or control the aircraft about a horizontal transverse axis. The controlling device consists of a vertical lever or joy stick mounted in a ball and socket joint 32, on a suitable standard 33 attached to the floor of the fuselage. The lever 31 is provided with a rearward integral horizontally extending projection 34 to which is attached a rod 35 connected to the lower control horn of the horizontal rudder 30. Extending forwardly from the lower end of the lever 31 and rigidly attached thereto or constructed integrally therewith, is a horizontal projection 36 provided with two horizontally extending projections 37 and 38. The parts 36, 37 and 38 are all in the same horizontal plane and it will be understood that the members 31, 36, 37 and 38 are all rigidly united together so as to be relatively immovable. A control cable 39 is attached to the upper horn of the aileron 28 at one end and is attached to the bar 38 at its other end. A control cable 40 interconnects the lower horn of the aileron 28 and the bar 38. Similar control cables 41 and 42 interconnect the upper and lower horns respectively of the left aileron 29 and the horizontal bar 37.

With this construction as set forth in Fig. 1, a movement of the lever 31 about a forwardly extending horizontal axis operates the ailerons alone, so that they move in opposite directions in the customary manner for lateral stability, the horizontal rudder 30 being maintained in its original position. When it is desired to ascend or descend, the control lever 31 is moved rearwardly or forwardly about a transverse horizontal axis, which causes the ailerons both to move in the same direction and simultaneously causes the horizontal rudder to move in a direction opposite to the direction of movement of the ailerons. For ascending or descending movements of the aircraft, the horizontal rudder will therefore assist the ailerons, both of which will be active in causing the airplane to assume its proper desired position.

I claim:

In an aircraft having a horizontal rudder, a main sustaining surface and a plurality of movable wing flaps therefor, a control device for controlling the wing flaps and horizontal rudder, comprising a stick control lever, a support for said lever, permitting rocking of said lever about a plurality of axes extending longitudinally and transversely of said aircraft, a rearward projection on said lever attached to said horizontal rudder, a longitudinally extending projection extending from said lever substantially coincident with said longitudinally extending axis, a lateral projection extending from the end of said longitudinally extending projection, a plurality of connections attached to said wing flaps, said connections being attached directly to said lateral projections so that said wing flaps may move in reverse directions relatively when the lever is rocked about the longitudinal axis and so that the wing flaps are moved together in the same direction while the horizontal rudder is moved simultaneously in a direction opposite to the movement of the wing flaps, when said lever is moved about said lateral axis.

In testimony whereof I affix my signature.

DENNIS F. CASHMAN.